(12) United States Patent
Chen

(10) Patent No.: US 8,794,704 B2
(45) Date of Patent: Aug. 5, 2014

(54) BACKREST SAFETY MECHANISM FOR CAR SEAT

(75) Inventor: Bangrui Chen, Taizhou (CN)

(73) Assignee: Zhejiang Tiancheng Seat Co., Ltd, Taizhou, Zhejiang Province (CN)

( * ) Notice: Subject to any disclaimer, the term of this patent is extended or adjusted under 35 U.S.C. 154(b) by 346 days.

(21) Appl. No.: 12/859,270

(22) Filed: Aug. 19, 2010

(65) Prior Publication Data

US 2011/0043021 A1 Feb. 24, 2011

(30) Foreign Application Priority Data

Aug. 19, 2009 (CN) .......................... 2009 1 0115803

(51) Int. Cl.
*B60N 2/22* (2006.01)
(52) U.S. Cl.
USPC .................... 297/354.1; 297/354.13; 297/366
(58) Field of Classification Search
USPC ........ 297/354.1, 354.12, 354.13, 357, 367 R, 297/378.12, 366
See application file for complete search history.

(56) References Cited

U.S. PATENT DOCUMENTS

| 3,262,737 | A | * | 7/1966 | Martens ................... 297/378.12 |
| 3,901,100 | A | * | 8/1975 | Iida et al. ................. 297/378.12 |
| 4,295,682 | A | * | 10/1981 | Kluting et al. ............ 297/367 R |
| 4,402,546 | A | * | 9/1983 | Johnson ........................ 297/374 |
| 5,116,102 | A | * | 5/1992 | Chaundy ....................... 297/357 |
| 5,248,178 | A | * | 9/1993 | Brambilla .................. 296/65.09 |
| 5,322,346 | A | * | 6/1994 | Notta et al. ............... 297/367 R |
| 5,588,705 | A | * | 12/1996 | Chang ..................... 297/378.12 |
| 6,565,156 | B1 | * | 5/2003 | Yamashita et al. ....... 297/354.12 |
| 8,104,141 | B2 | * | 1/2012 | Yamashita .................... 297/356 |

* cited by examiner

*Primary Examiner* — Peter Brown
(74) *Attorney, Agent, or Firm* — Global IP Services; Tianhua Gu

(57) ABSTRACT

A backrest safety mechanism is disclosed. The backrest safety mechanism includes a backrest frame, a seat frame, and an angle-adjusting device. A side of the angle-adjusting device is connected to the backrest frame, and another side of the angle-adjusting device is connected to the seat frame. When the backrest frame is located at a front limiting position or a rear limiting position, limiting structures respectively disposed on the backrest frame and the seat frame abut against each other.

7 Claims, 9 Drawing Sheets

BACKREST SAFETY MECHANISM FOR CAR SEAT

BACKGROUND OF THE INVENTION

1. Field of the Invention

The present invention relates to a backrest safety mechanism, and more specifically, to a backrest safety mechanism for a car seat.

2. Description of the Prior Art

In the structural design of a car seat, the backrest frame of a backrest and a seat frame of a seat cushion are connected rotatably or movably in the cab. This connecting mode contains no backrest safety mechanism limiting the front or rear position of a car seat.

During a car crash, a driver or a passenger sitting inside the car may experience a huge impact under the effect of inertia. If the driver or the passenger uses a safety belt, especially a 3-point safety belt, the safety belt may accordingly exert a huge pulling or impact force upon a seat during the car crash. The huge pulling or impact force may cause the connecting mechanism to lose its efficacy so that the driver or the passenger may be hurt during the car crash due to over-rotation of the backrest.

SUMMARY OF THE INVENTION

The present invention provides a backrest safety mechanism comprising a backrest frame; a seat frame, limiting structures respectively disposed on the backrest frame and the seat frame abutting against each other when the backrest frame is located at a front limiting position or a rear limiting position; and an angle-adjusting device connected between the backrest frame and the seat frame.

These and other objectives of the present invention will no doubt become obvious to those of ordinary skill in the art after reading the following detailed description of the preferred embodiment that is illustrated in the various figures and drawings.

DETAILED DESCRIPTION

In the following, embodiments are taken as examples for more detailed description of the present invention.

First Embodiment

Figure 1:
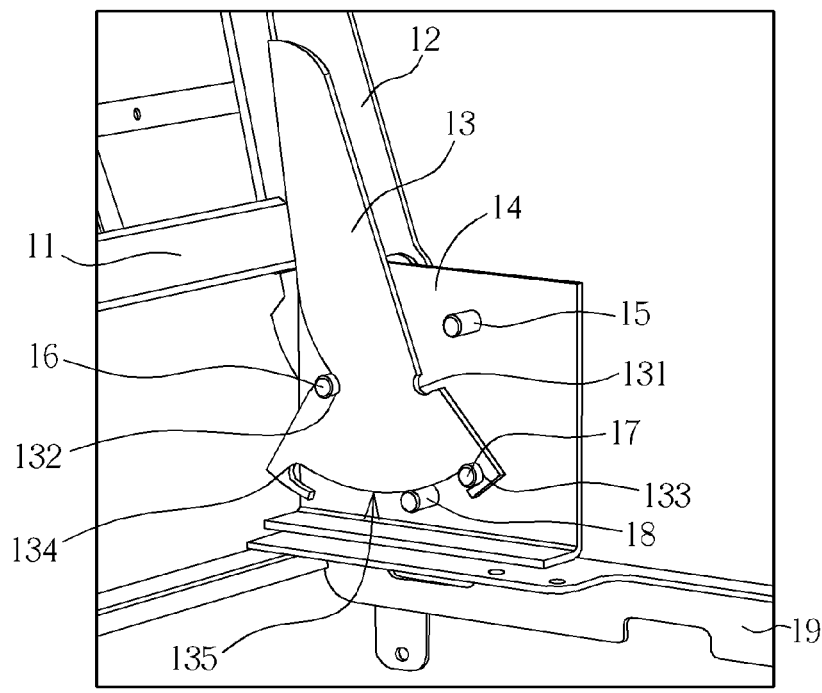
FIG. 1 is a partial diagram of a backrest rotating forward according to the first embodiment of the present invention.

Please refer to FIG. 1. A backrest safety mechanism as shown in FIG. 1 includes a backrest frame 11, an angle-adjusting device 12, a backrest supporting plate 13, a seat frame 19, and a seat supporting plate 14. A side of the angle-adjusting device 12 is connected to the backrest frame 11 by screws, and another side is also connected to the seat frame 19 by screws. An upper end of the backrest supporting plate 13 is welded with the backrest frame 11. A lower surface of the seat supporting plate 14 is also welded with the seat frame 19. Openings 131 and 132 are formed at a front side and a rear side of the backrest supporting plate 13, respectively. An arc-shaped opening 135 is formed at the lower side of the backrest supporting plate 13. Four pins (utilized as limiting blocks) 15, 16, 17, and 18 are welded on a vertical portion of the seat supporting plate 14. When a front portion of a car is impacted to cause the angle-adjusting device 12 to lose its efficacy, the backrest may rotate forward to a position as shown in FIG. 1. At this time, the pin 16 is engaged with the opening 132, and the pin 17 is engaged with a front end 133 of the arc-shaped opening 135. In such a manner, the backrest supporting plate 13 is incapable of moving backward or upward, so as to prevent the backrest frame 11 from rotating forward. Thus, force exerted upon the backrest can be mostly received by the backrest supporting plate 13 and the seat supporting plate 14 so as to make the backrest capable of bearing greater impact force.

Figure 2:
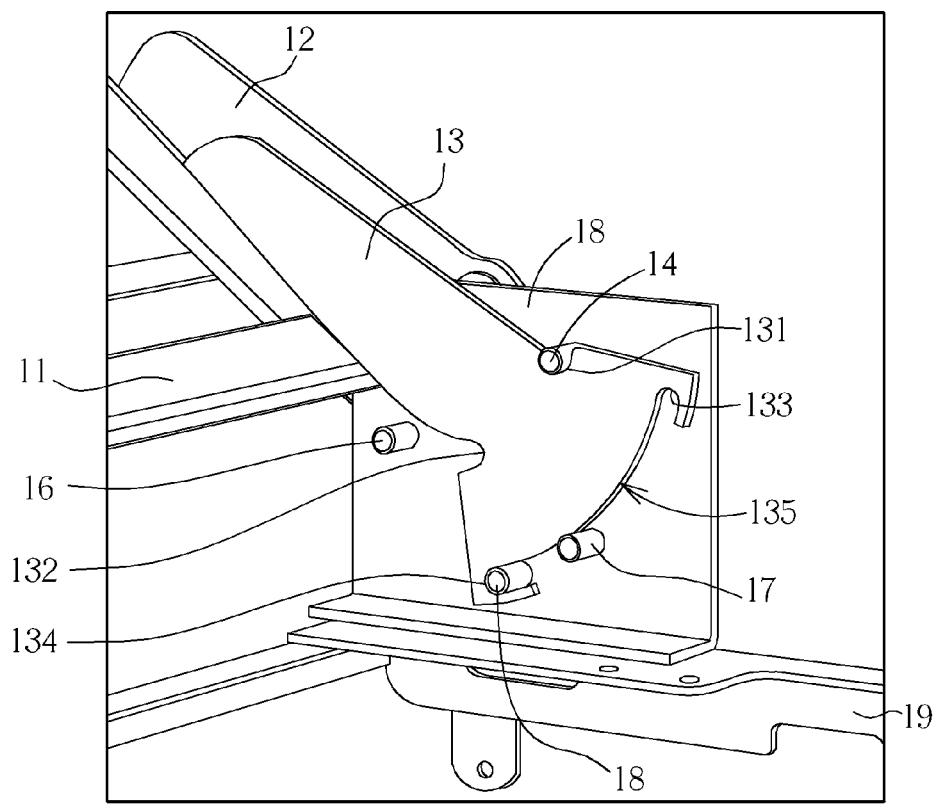
FIG. 2 is a partial diagram of the backrest in FIG. 1 rotating backward.

Please refer to FIG. 2, which shows another operating state of the backrest as shown in FIG. 1. When a rear portion of the car is impacted to cause the angle-adjusting device 12 to lose its efficacy, the backrest may rotate backward to a position as shown in FIG. 2. At this time, the pin 15 is engaged with the opening 131, and the pin 18 is engaged with a rear end 134 of the arc-shaped opening 135. In such a manner, the backrest supporting plate 13 is incapable of moving forward or upward, so as to prevent the backrest frame 11 from rotating backward. Thus, force exerted upon the backrest can be mostly received by the backrest supporting plate 13 and the seat supporting plate 14 so as to make the backrest capable of bearing greater impact force.

The present invention may only utilize the pins 15 and 16 or the pins 17 and 18 to achieve the aforementioned purpose as long as the pins 15, 16, 17, and 18 and the related parts have sufficient structural strength. The backrest supporting plate 13 may be connected to the backrest frame 11 by screws instead, and the seat supporting plate 14 may also be connected to the seat frame 19 by screws. The pins 15, 16, 17, and 18 may also be screwed or riveted on the seat supporting plate 14.

Second Embodiment

Figure 3:
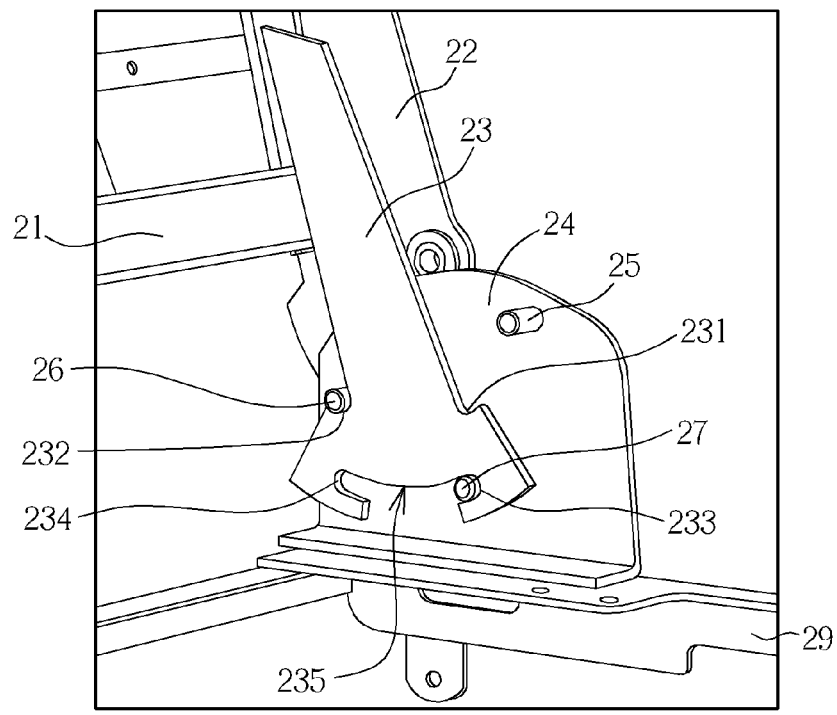
FIG. 3 is a partial diagram of a backrest rotating forward according to the second embodiment of the present invention.

Please refer to FIG. 3. The structure mentioned in the second embodiment is substantially the same as that mentioned in the first embodiment. A backrest safety mechanism as shown in FIG. 3 includes a backrest frame 21, an angle-adjusting device 22, a backrest supporting plate 23, a seat frame 29, and a seat supporting plate 24. A side of the angle-adjusting device 22 is connected to the backrest frame 21 by screws, and another side is also connected to the seat frame 29 by screws. An upper end of the backrest supporting plate 23 is welded with the backrest frame 21. A lower surface of the seat supporting plate 24 is also welded with the seat frame 29. Openings 231 and 232 are formed at a front side and a rear side of the backrest supporting plate 23, respectively. An arc-shaped opening 235 is formed at a lower side of the backrest supporting plate 23. Three pins (utilized as limiting blocks) 25, 26, and 27 are welded on a vertical portion of the seat supporting plate 24. When a front portion of a car is impacted to cause the angle-adjusting device 22 to lose its efficacy, the backrest may rotate forward to a position as shown in FIG. 3. At this time, the pin 26 is engaged with the opening 232, and the pin 27 is engaged with a front end 233 of the arc-shaped opening 235. In such a manner, the backrest supporting plate 23 is incapable of moving backward or upward, so as to prevent the backrest frame 21 from rotating forward. Thus, force exerted upon the backrest can be mostly received by the backrest supporting plate 23 and the seat supporting plate 24 so as to make the backrest capable of bearing greater impact force.

Figure 4:
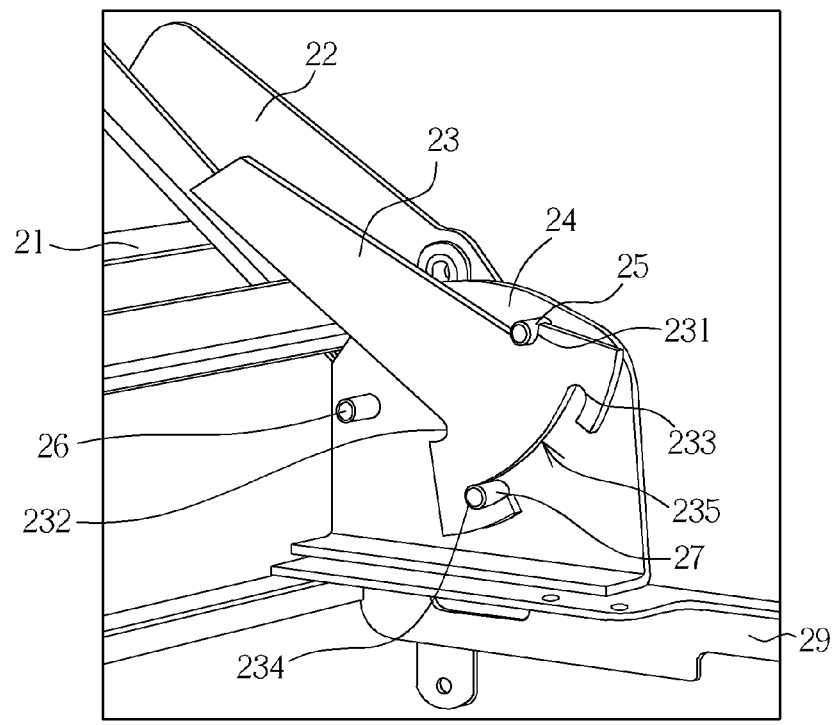
FIG. 4 is a partial diagram of the backrest in FIG. 3 rotating backward.

Please refer to FIG. 4, which shows another operating state of the backrest as shown in FIG. 3. When a rear portion of the car receives impact to cause the angle-adjusting device 22 to lose its efficacy, the backrest may rotate backward to a position as shown in FIG. 4. At this time, the pin 25 is engaged with the opening 231, and the pin 278 is engaged with a rear end 234 of the arc-shaped opening 235. In such a manner, the backrest supporting plate 23 is incapable of moving forward or upward, so as to prevent the backrest frame 21 from rotating backward. Thus, force exerted upon the backrest can be mostly received by the backrest supporting plate 23 and the seat supporting plate 24 so as to make the backrest capable of bearing greater impact force.

The present invention may only utilize the pin 27 or the pins 25 and 26 to achieve the aforementioned purpose as long as the pins 25, 26, and 27 and the related parts have sufficient structural strength. Similarly, the backrest supporting plate 23 may be connected to the backrest frame 21 by screws instead, and the seat supporting plate 24 may also be connected to the seat frame 29 by screws. The pins 25, 26, and 27 may also be screwed or riveted on the seat supporting plate 24.

Third Embodiment

Figure 5:
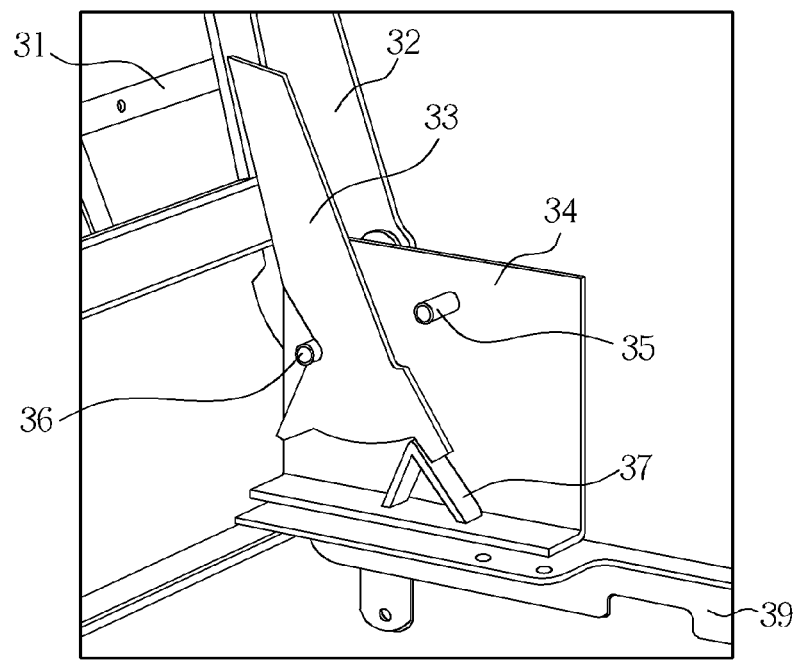
FIG. 5 is a partial diagram of a backrest rotating forward according to the third embodiment of the present invention.

Please refer to FIG. 5. The structure mentioned in the third embodiment is substantially the same as that mentioned in the second embodiment. A backrest safety mechanism as shown in FIG. 5 includes a backrest frame 31, an angle-adjusting device 32, a backrest supporting plate 33, a seat frame 39, and a seat supporting plate 34. A side of the angle-adjusting device 32 is connected to the backrest frame 31 by screws, and another side is also connected to the seat frame 39 by screws. An upper end of the backrest supporting plate 33 is welded with the backrest frame 31. A lower surface of the seat supporting plate 34 is also welded with the seat frame 39. An Opening is formed at a front side, a rear side and a lower side of the backrest supporting plate 33, respectively. Two pins (utilized as limiting blocks) 35 and 36 are welded on a vertical portion of the seat supporting plate 34. A triangular block (utilized as a limiting block) 37 is welded on a horizontal portion of the seat supporting plate 34. When a front portion of a car is impacted to cause the angle-adjusting device 22 to lose its efficacy, the backrest may rotate forward to a position as shown in FIG. 5. At this time, a front end of the triangular block 37 abuts against a front end of the opening located at the lower side of the backrest supporting plate 33, and the pin 36 is engaged with the opening located at the rear side of the backrest supporting plate 33. In such a manner, the backrest supporting plate 33 is incapable of moving backward or upward, so as to prevent the backrest frame 31 from rotating forward. Thus, force exerted upon the backrest can be mostly received by the backrest supporting plate 33 and the seat supporting plate 34 so as to make the backrest capable of bearing greater impact force.

Figure 6:
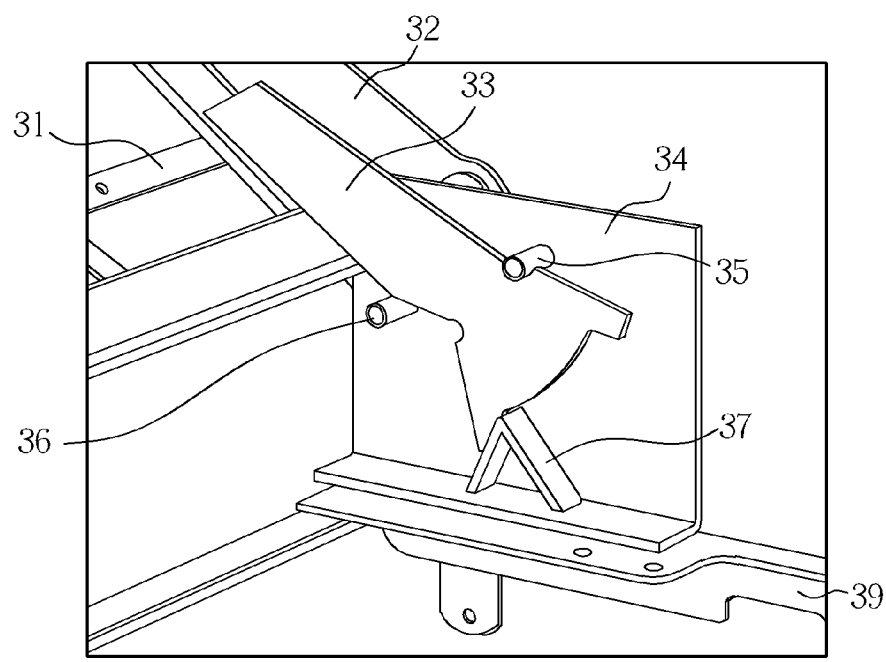
FIG. 6 is a partial diagram of the backrest in FIG. 5 rotating backward.

Please refer to FIG. 6, which shows another operating state of the backrest as shown in FIG. 5. When a rear portion of the car is impacted to cause the angle-adjusting device 32 to lose its efficacy, the backrest may rotate backward to a position as shown in FIG. 6. At this time, a rear side of the triangular block 37 abuts against a rear end of the opening located at the lower side of the backrest supporting plate 33, and the pin 35 is engaged with the opening located at the front side of the backrest supporting plate 33. In such a manner, the backrest supporting plate 33 is incapable of moving forward or upward, so as to prevent the backrest frame 31 from rotating backward. Thus, force exerted upon the backrest can be mostly received by the backrest supporting plate 33 and the seat supporting plate 34 so as to make the backrest capable of bearing greater impact force.

The present invention may only utilize the triangular block 37 or the pins 35 and 36 to achieve the aforementioned purpose as long as the triangular block 37, the pins 35 and 36, and the related parts have sufficient structural strength. Similarly, the backrest supporting plate 33 may be connected to the backrest frame 31 by screws instead, and the seat supporting plate 34 may also be connected to the seat frame 39 by screws. The pins 35 and 36 may also be screwed or riveted on the seat supporting plate 34.

Fourth Embodiment

Figure 7:
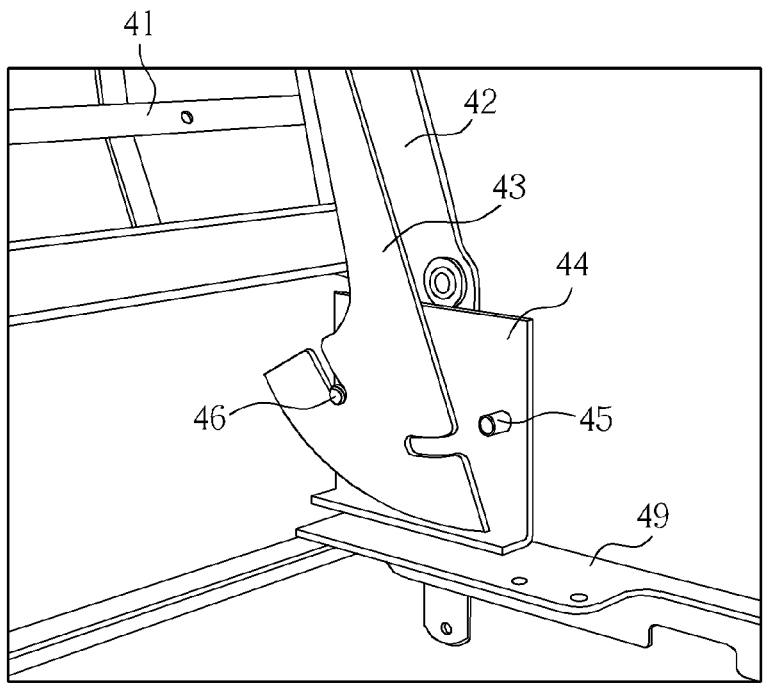
FIG. 7 is a partial diagram of a backrest rotating forward according to the fourth embodiment of the present invention.

Please refer to FIG. 7. The structure mentioned in the fourth embodiment is substantially the same as that mentioned in the third embodiment. A backrest safety mechanism as shown in FIG. 7 includes a backrest frame 41, an angle-adjusting device 42, a backrest supporting plate 43, a seat frame 49, and a seat supporting plate 44. A side of the angle-adjusting device 42 is connected to the backrest frame 41 by screws, and another side is also connected to the seat frame 49 by screws. An upper end of the backrest supporting plate 43 is welded with the backrest frame 41. A lower surface of the seat supporting plate 44 is also welded with the seat frame 49. An opening is formed at a front side and a rear side of the backrest supporting plate 43, respectively. A front limiting surface and a rear limiting surface are formed on a bottom of the backrest supporting plate 43. Two pins 45 and 46 are welded on a vertical portion of the seat supporting plate 44. When a front portion of a car is impacted to cause the angle-adjusting device 42 to lose its efficacy, the backrest may rotate forward to a position as shown in FIG. 7. At this time, the said front limiting surface located at the bottom of the backrest supporting plate 43 abuts against an upper surface of a horizontal portion of the seat supporting plate 44, and the pin 46 is engaged with the opening located at the rear side of the backrest supporting plate 43. In such a manner, the backrest supporting plate 43 is incapable of moving backward or upward, so as to prevent the backrest frame 41 from rotating forward. Thus, force exerted upon the backrest can be mostly received by the backrest supporting plate 43 and the seat supporting plate 44 so as to make the backrest capable of bearing greater impact force.

Figure 8:
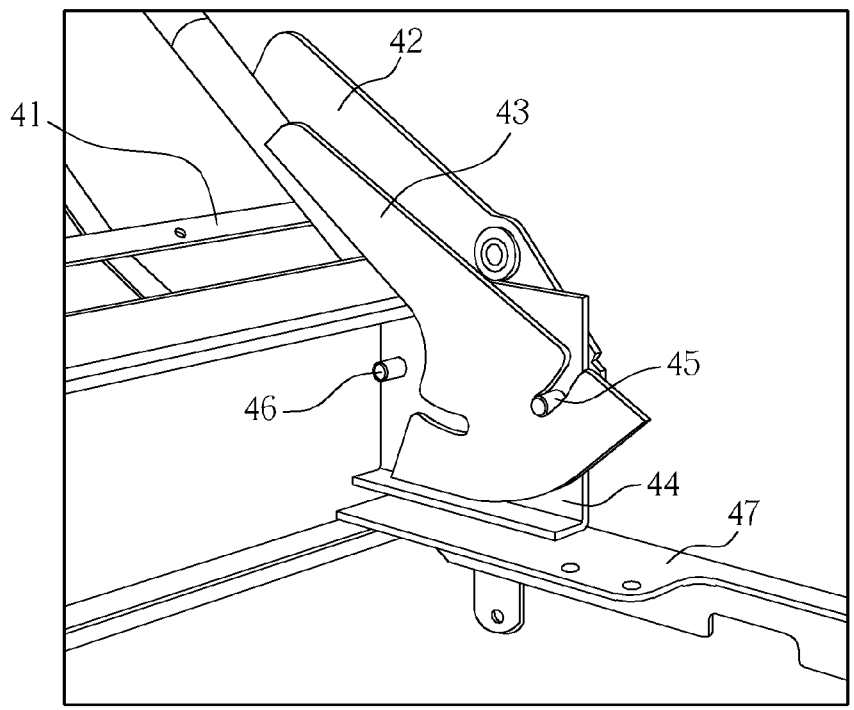
FIG. 8 is a partial diagram of the backrest in FIG. 7 rotating backward.

Please refer to FIG. 8, which shows another operating state of the backrest as shown in FIG. 7. When a rear portion of the car is impacted to cause the angle-adjusting device 42 to lose its efficacy, the backrest may rotate backward to a position as shown in FIG. 8. At this time, the said rear limiting surface located at the bottom of the backrest supporting plate 43 abuts against the upper surface of the horizontal portion of the seat supporting plate 44, and the pin 45 is engaged with the opening located at the front side of the backrest supporting plate 43. In such a manner, the backrest supporting plate 43 is incapable of moving forward or upward, so as to prevent the backrest frame 41 from rotating backward. Thus, force exerted upon the backrest can be mostly received by the backrest supporting plate 43 and the seat supporting plate 44 so as to make the backrest capable of bearing greater impact force.

The present invention may only utilize the limiting surfaces on the seat supporting plate 44 and the backrest supporting plate 43 or the pins 45 and 46 to achieve the aforementioned purpose as long as the limiting surfaces, the pins 45 and 46, and the related parts have sufficient structural strength. Similarly, the backrest supporting plate 43 may be connected to the backrest frame 41 by screws instead, and the seat supporting plate 44 may also be connected to the seat frame 49 by screws. The pins 45 and 46 may also be screwed or riveted on the seat supporting plate 44.

Fifth Embodiment

Figure 9:
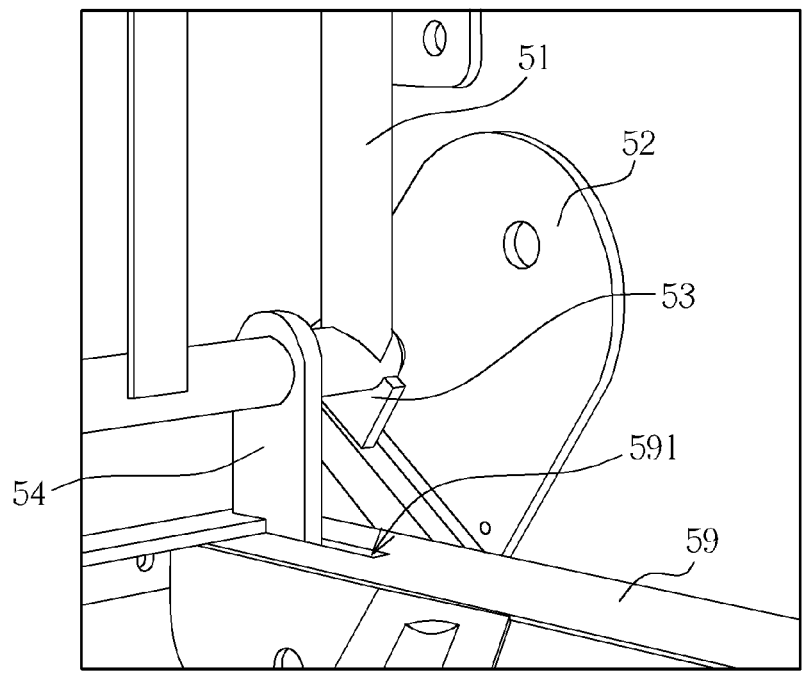
FIG. 9 is a partial diagram of a backrest rotating forward according to the fifth embodiment of the present invention.
Figure 10:
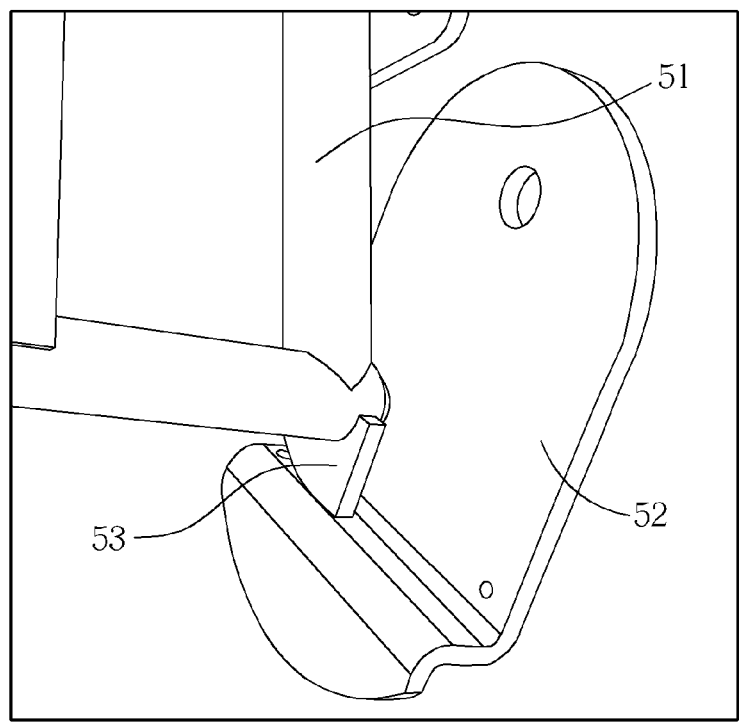
FIG. 10 is a partial enlarged diagram of the backrest in FIG. 9.

Please refer to FIG. 9 and FIG. 10. A backrest safety mechanism as shown in FIG. 9 includes a backrest frame 51, a gas spring (utilized as an angle-adjusting device and not shown in figures), a backrest supporting block 53, a seat frame 59, and a seat supporting plate 52. The backrest frame 51 has an angle-adjusting device connecting plate 54. A limiting slot 591 is formed on the seat frame 59 corresponding to the angle-adjusting device connecting plate 54. The angle-adjusting device connecting plate 54 is slidably disposed inside the limiting slot 591. A side of the gas spring is connected to the angle-adjusting device connecting plate 54 by rivets, and another side is also connected to the seat frame 59 by rivets. Aside surface of the seat supporting plate 52 is welded or screwed on the seat frame 59. The backrest frame 51 is pivotally connected to the seat supporting plate 52 by screws, so that the backrest frame 51 is capable of rotating relative to the seat frame 59. An upper end of the backrest supporting block 53 is welded with the backrest frame 51. When a front portion of a car is impacted to cause the related angle-adjusting device to lose its efficacy, the backrest may rotate forward to a position as shown in FIG. 9. At this time, a front limiting surface of the backrest supporting block 53 abuts against an upper limiting surface of the seat supporting plate 52, and a rear side of the angle-adjusting device connecting plate 54 abuts against a rear end of the limiting slot 591. In such a manner, the backrest supporting plate 51 is incapable of moving forward. Thus, force exerted upon the backrest can be mostly received by the backrest supporting block 53, the seat supporting plate 52, the angle-adjusting device connecting plate 54, and the seat frame 59, so as to make the backrest capable of bearing greater impact force.

Figure 11:
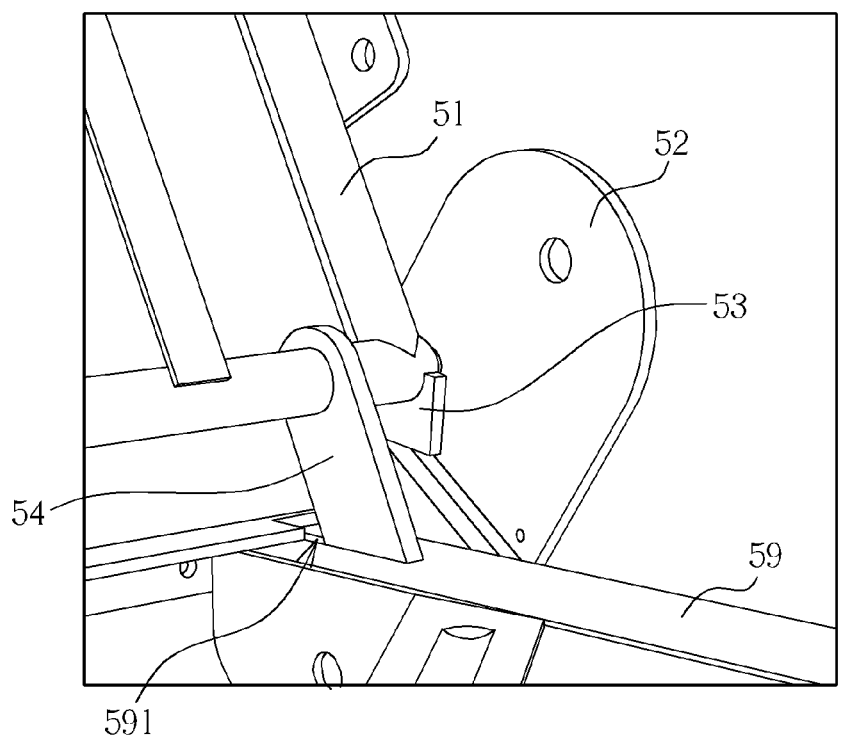
FIG. 11 is a partial diagram of the backrest in FIG. 9 rotating backward.
Figure 12:
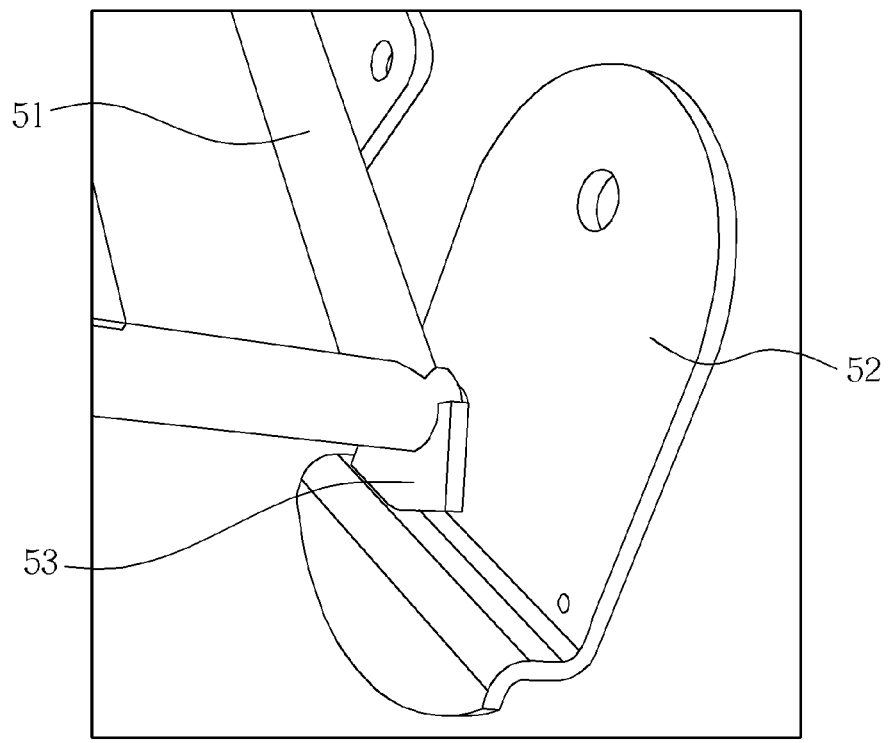
FIG. 12 is a partial enlarged diagram of the backrest in FIG. 11.

Please refer to FIGS. 11 and 12, which show another operating state of the backrest as shown in FIG. 9. When a rear portion of the car is impacted to cause the related angle-adjusting device to lose its efficacy, the backrest may rotate backward to a position as shown in FIG. 11. At this time, a rear limiting surface of the backrest supporting block 53 abuts against the upper limiting surface of the seat supporting plate 52, and a front side of the angle-adjusting device connecting plate 54 abuts against a front end of the limiting slot 591. In such a manner, the backrest frame 51 is incapable of rotating backward. Thus, force exerted upon the backrest can be mostly received by the backrest supporting block 53, the seat supporting plate 52, the angle-adjusting-device connecting plate 54, and the seat frame 59, so as to make the backrest capable of bearing greater impact force.

The present invention may only utilize disposal of the angle-adjusting device connecting plate 54 inside the limiting slot 591 or abutting of the backrest supporting block 53 against the upper limiting surface of the seat supporting plate 52 to achieve the aforementioned purpose as long as the angle-adjusting device connecting plate 54, the backrest supporting block 53, and the seat supporting plate 52 have sufficient structural strength.

Sixth Embodiment

Figure 13:
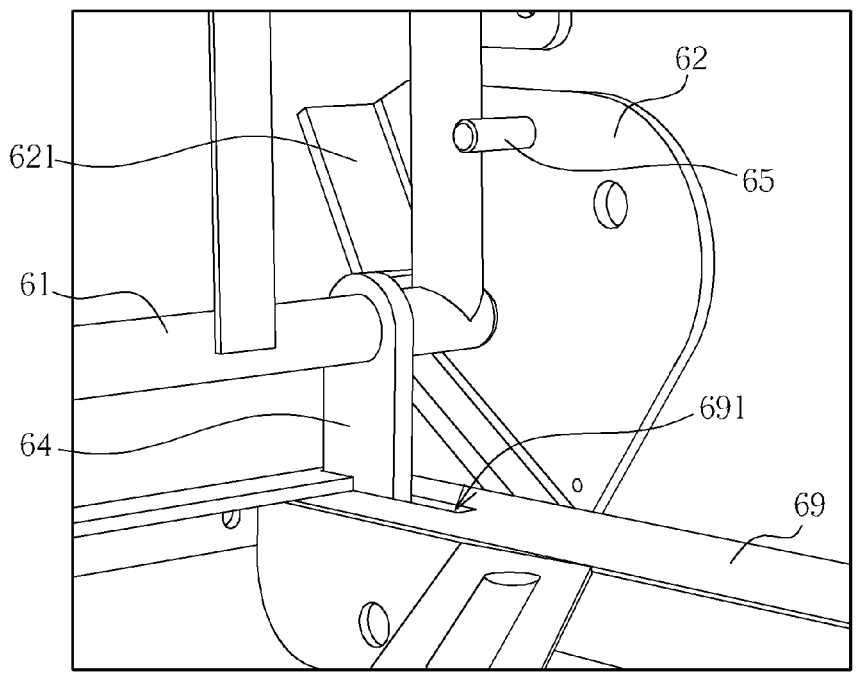
FIG. 13 is a partial diagram of a backrest rotating forward according to the sixth embodiment of the present invention.

Please refer to FIG. 13. A backrest safety mechanism as shown in FIG. 13 includes a backrest frame 61, a gas spring (utilized as an angle-adjusting device and not shown in figures), a seat frame 69, and a seat supporting plate 62. The backrest frame 61 has an angle-adjusting device connecting plate 64. A limiting slot 691 is formed on the seat frame 69. The angle-adjusting device connecting plate 64 is slidably disposed inside the limiting slot 691. A side of the gas spring is connected to the angle-adjusting device connecting plate 64 by rivets, and another side is also connected to the seat frame 69 by rivets. A side surface of the seat supporting plate 62 is welded or screwed on the seat frame 69. The backrest frame 61 is pivotally connected to the seat supporting plate 62 by screws so that the backrest frame 61 is capable of rotating relative to the seat frame 69. A limiting pin 65 is welded on a vertical portion of the seat supporting plate 62, and a limiting baffle 621 is formed at a rear side of the seat supporting plate 62. When a front portion of a car receives impact to cause the related angle-adjusting device to lose its efficacy, the backrest may rotate forward to a position as shown in FIG. 13. At this time, the limiting pin 65 abuts against the backrest frame 61, and a rear side of the angle-adjusting device connecting plate 64 abuts against a rear end of the limiting slot 691. In such a manner, the backrest frame 61 is incapable of rotating forward. Thus, force exerted upon the backrest can be mostly received by the backrest frame 61, the seat supporting plate 62, the angle-adjusting device connecting plate 64 and the seat frame 69, so as to make the backrest capable of bearing greater impact force.

Figure 14:
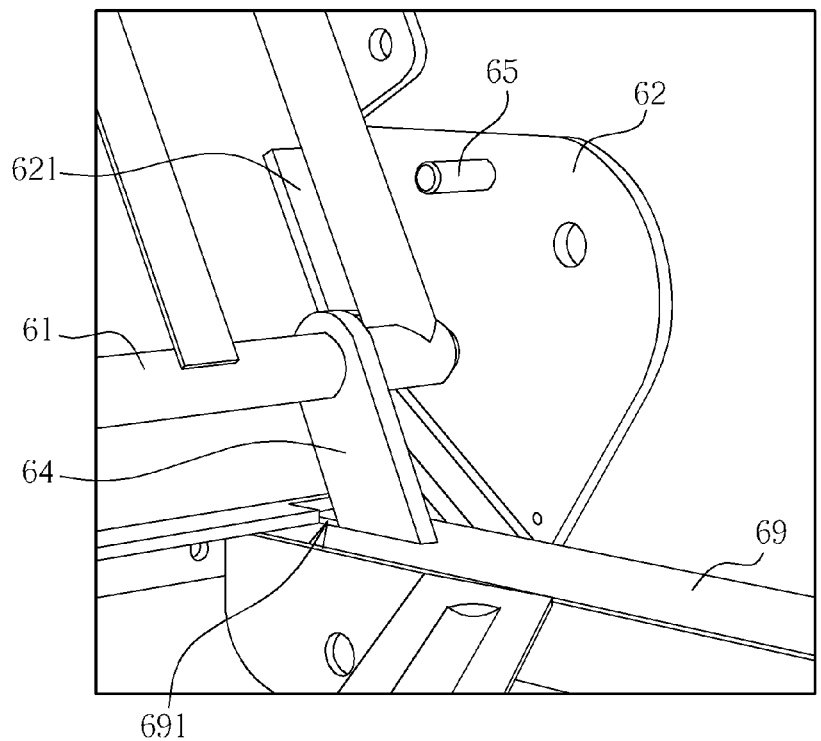
FIG. 14 is a partial diagram of the backrest in FIG. 13 rotating backward.

Please refer to FIG. 14, which shows another operating state of the backrest as shown in FIG. 13. When a rear portion of the car is impacted to cause the related angle-adjusting device to lose its efficacy, the backrest may rotate backward to a position as shown in FIG. 14. At this time, the backrest frame 61 abuts against the limiting baffle 621 of the backrest supporting plate 62, and a front side of the angle-adjusting device connecting plate 64 abuts against a front end of the limiting slot 691. In such a manner, the backrest frame 61 is incapable of rotating backward. Thus, force exerted upon the backrest can be mostly received by the backrest frame 61, the seat supporting plate 62, the angle-adjusting device connecting plate 64 and the seat frame 69, so as to make the backrest capable of bearing greater impact force.

The present invention may only utilize disposal of the angle-adjusting device connecting plate 64 inside the limiting slot 691 or abutting of the limiting pin 65 against the limiting baffle 621 to achieve the aforementioned purpose as long as the angle-adjusting device connecting plate 64, the limiting pin 65, and the limiting baffle 621 have sufficient structural strength.

Seventh Embodiment

Figure 15:
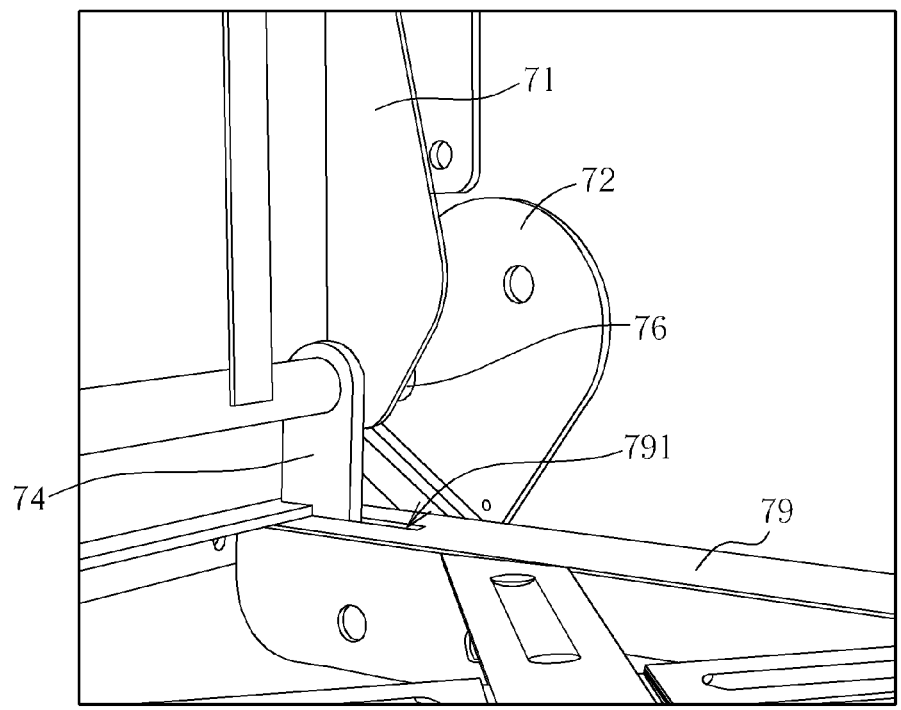
FIG. 15 is a partial diagram of a backrest rotating forward according to the seventh embodiment of the present invention.
Figure 16:
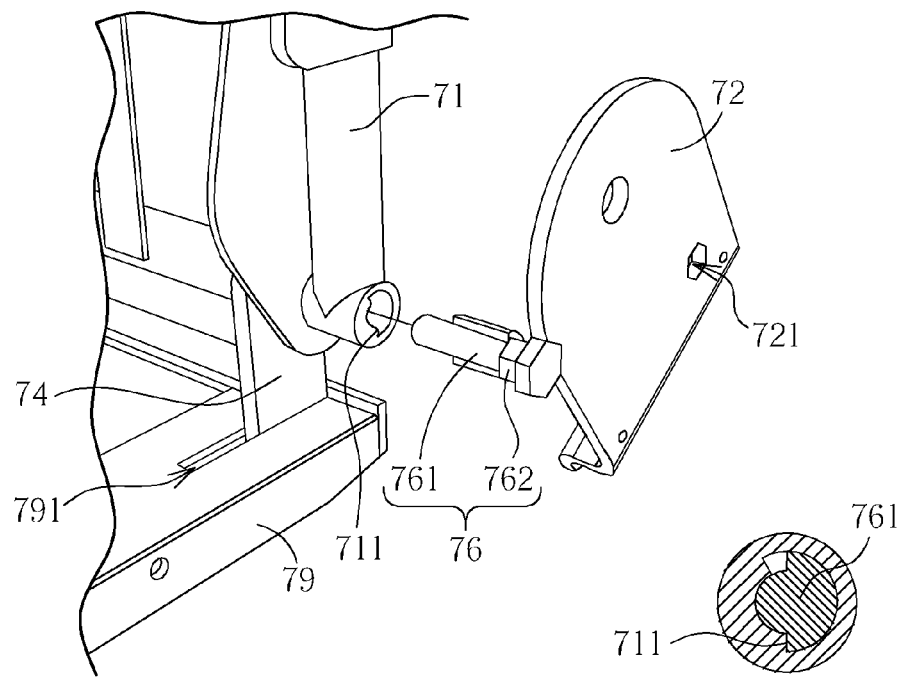
FIG. 16 is a partial exploded diagram of the backrest in FIG. 15.

Please refer to FIG. 15 and FIG. 16. A backrest safety mechanism as shown in FIG. 15 includes a backrest frame 71, a gas spring (utilized as an angle-adjusting device and not shown in figures), a seat frame 79, a seat supporting plate 72, and a screw connecting part 76. The backrest frame 71 has an angle-adjusting device connecting plate 74. A limiting slot 791 is formed on the seat frame 79. The angle-adjusting device connecting plate 74 is slidably disposed inside the limiting slot 791. A side of the gas spring is connected to the angle-adjusting device connecting plate 74 by rivets, and another side is also connected to the seat frame 79 by rivets. A side surface of seat supporting plate 72 is welded or screwed on the seat frame 79. A hexagonal hole 721 is formed on a vertical portion of the seat supporting plate 72. An arc-shaped block 761 and a hexagonal shoulder 762. An arc-shaped limiting structure 711 is formed inside a pivot pipe of the backrest frame 71. A position of the arc-shaped block 761 relative to the arc-shaped limiting structure 711 may depend on angle adjustment of the backrest. The backrest frame 71 is pivotally connected to the seat supporting plate 72 via the screw connecting part 76, so that the backrest frame 71 is capable of rotating relative to the seat frame 79. The hexagonal shoulder 762 of the screw connecting part 76 is engaged with the hexagonal hole 721 of the seat supporting plate 72 so as to make the screw connecting part 76 incapable of rotating backward relative to the seat supporting plate 72. When a front portion of a car is impacted to cause the related angle-adjusting device to lose its efficacy, the backrest may rotate forward to a position as shown in FIG. 15. At this time, a lower surface of the arc-shaped limiting structure 711 abuts against a lower surface of the arc-shaped block 761, and a rear side of the angle-adjusting device connecting plate 74 abuts against a rear end of the limiting slot 791. In such a manner, the backrest frame 71 is incapable of rotating forward. Thus, force exerted upon the backrest can be mostly received by the backrest frame 71, the seat supporting plate 72, the angle-adjusting device connecting plate 64 and the seat frame 79, so as to make the backrest capable of bearing greater impact force.

In the present invention, said hexagonal shoulder 762 may be changed to other polygonal structure (e.g. a triangular shoulder, a quadrangular shoulder, or a pentagonal shoulder), and the hexagonal hole 721 may be correspondingly changed to another conforming polygonal hole.

Figure 17:
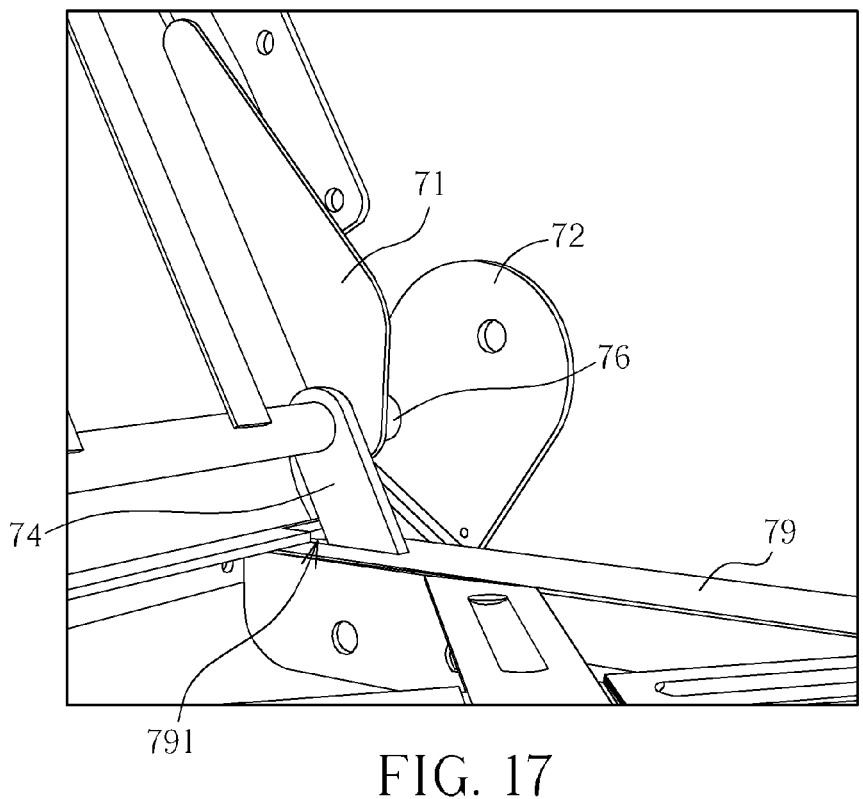
FIG. 17 is a partial diagram of the backrest in FIG. 15 rotating backward.
Figure 18:
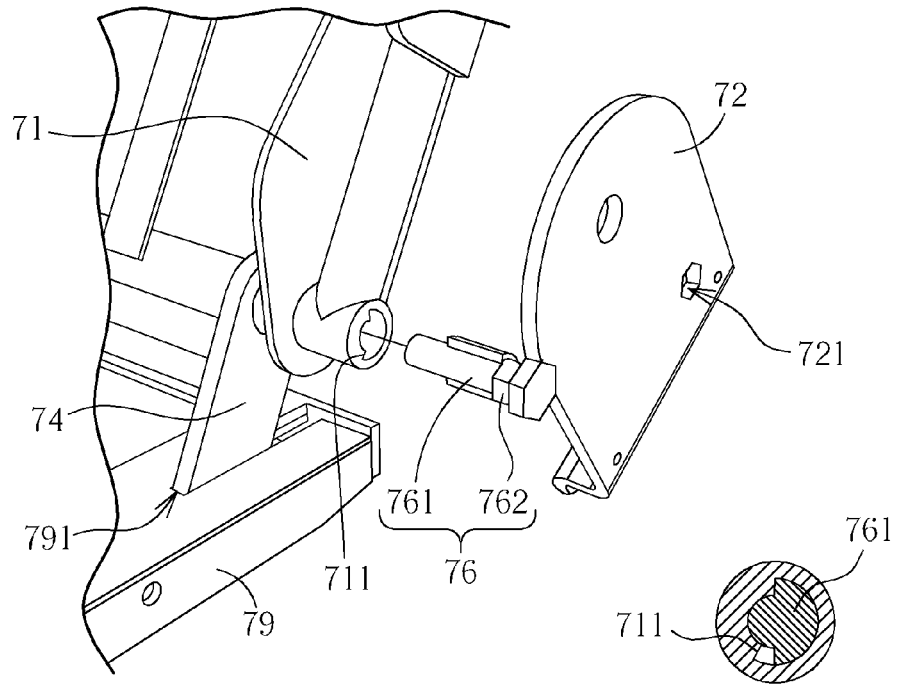
FIG. 18 is a partial exploded diagram of the backrest in FIG. 17.

Please refer to FIG. 17 and FIG. 18, which show another operating state of the backrest as shown in FIG. 15 and FIG. 16. When a rear portion of the car is impacted to cause the related angle-adjusting device to lose its efficacy, the backrest may rotate backward to a position as shown in FIG. 17. At this time, an upper surface of the arc-shaped limiting structure 711 abuts against an upper surface of the arc-shaped block 761, and a front side of the angle-adjusting device connecting plate 74 abuts against a front end of the limiting slot 791. In such a manner, the backrest frame 71 is incapable of rotating backward. Thus, force exerted upon the backrest can be mostly received by the backrest frame 71, the seat supporting plate 72, the angle-adjusting-device connecting plate 74 and the seat frame 79, so as to make the backrest capable of bearing greater impact force.

The present invention may only utilize disposal of the angle-adjusting device connecting plate 74 inside the limiting slot 791 or abutting of the arc-shaped block 761 against the arc-shaped limiting structure 711 to achieve the aforementioned purpose as long as the angle-adjusting device connecting plate 74, the arc-shaped block 761, and the arc-shaped limiting structure 711 have sufficient structural strength.

The backrest safety mechanism provided by the present invention may not only be applied to any side of a backrest, but also be applied to two sides of a backrest.

Those skilled in the art will readily observe that numerous modifications and alterations of the device and method may be made while retaining the teachings of the invention.

What is claimed is:

1. A backrest safety mechanism comprising:
   a seat frame;
   a seat supporting plate fixedly connected to the seat frame;
   a backrest frame pivotally connected to the seat supporting plate;
   an angle-adjusting device disposed on a side of the seat supporting plate and connected between the backrest frame and the seat frame for positioning the backrest frame at an angle relative to the seat frame;
   a backrest supporting plate disposed on an opposite side of the seat supporting plate and fixedly connected to the backrest frame; and
   at least one first limiting block formed on the seat supporting plate for engaging a first opening formed on a lower surface of the backrest supporting plate to limit the angle within a range between a front limiting position and a rear limiting position defined by the at least one first limiting block and the first opening.

2. The backrest safety mechanism of claim 1, wherein the first opening is an arc-shaped opening; and
   the at least one first limiting block is formed on a horizontal portion of the seat supporting plate which engages a front end the arc-shaped opening when the backrest supporting plate is pivoted to the front limiting position and engages a rear end of the arc-shaped opening when the backrest supporting plate is pivoted to the rear limiting position.

3. The backrest safety mechanism of claim 2, wherein the backrest supporting plate further comprising
   a second opening formed on a front surface of the backrest supporting plate which engages a second limiting block formed on a vertical portion of the seat supporting plate when the backrest supporting plate is pivoted to the front limiting position and
   a third opening formed on a rear surface of the backrest supporting plate which engages a third limiting block formed on the vertical portion of the seat supporting plate when the backrest supporting plate is pivoted to the rear limiting position.

4. The backrest safety mechanism of claim 2, further comprising
   a second limiting block formed on a vertical portion of the seat supporting plate, which engages a front surface of the backrest supporting plate when the first opening of the backrest supporting plate is blocked by the first limiting block at the front limiting position, and a third limiting block formed on a vertical portion of the seat supporting plate, which engages a rear surface of the backrest supporting plate when the first opening of the backrest supporting plate is blocked by the first limiting block at the rear limiting position.

5. The backrest safety mechanism of claim 1, wherein the first opening is an arc-shaped opening; and the at least one first limiting block is formed on a vertical portion of the seat supporting plate engages a front end the arc-shaped opening when the backrest supporting plate is pivoted to the front limiting position and engages a rear end of the arc-shaped opening when the backrest supporting plate is pivoted to the rear limiting position.

6. The backrest safety mechanism of claim 5, further comprising a second limiting block formed on a vertical portion of the seat supporting plate, which engages a front surface of the backrest supporting plate when the first opening of the backrest supporting plate is blocked by the first limiting block at the front limiting position, and a third limiting block formed on a vertical portion of the seat supporting plate, which engages a rear surface of the backrest supporting plate when the first opening of the backrest supporting plate is blocked by the first limiting block at the rear limiting position.

7. The backrest safety mechanism of claim 1, wherein the first limiting block has a profile chosen from the list of cylindrical and triangular.

* * * * *